United States Patent [19]

Ungar

[11] Patent Number: 6,085,035
[45] Date of Patent: Jul. 4, 2000

[54] METHOD AND APPARATUS FOR EFFICIENT OPERATIONS ON PRIMARY TYPE VALUES WITHOUT STATIC OVERLOADING

[75] Inventor: David M. Ungar, Palo Alto, Calif.

[73] Assignee: Sun Microsystems, Inc., Palo Alto, Calif.

[21] Appl. No.: 08/926,060

[22] Filed: Sep. 9, 1997

[51] Int. Cl.[7] .................................................. G06F 9/45
[52] U.S. Cl. ...................... 395/705; 395/704; 395/705; 709/221
[58] Field of Search .................................... 395/701, 702, 395/704, 705, 708, 709; 364/230, 280.4, 957.4, 963.3; 295/704, 705, 706; 709/221

[56] References Cited

U.S. PATENT DOCUMENTS

| | | | |
|---|---|---|---|
| 5,276,880 | 1/1994 | Platoff et al. | 395/708 |
| 5,577,253 | 11/1996 | Blickstein | 395/705 |
| 5,630,066 | 5/1997 | Goslings | 709/221 |
| 5,649,179 | 7/1997 | Steenstra et al. | 395/598 |
| 5,659,753 | 8/1997 | Murphy | 395/705 |
| 5,696,973 | 12/1997 | Agrawal et al. | 395/709 |
| 5,740,441 | 4/1998 | Yellin et al. | 395/704 |
| 5,748,963 | 5/1998 | Orr | 395/704 |
| 5,748,964 | 5/1998 | Goslings | 395/705 |

OTHER PUBLICATIONS

Lins, R.D., "A Multi–processor Shared Memory Architecture for Parallel Cyclic Reference Counting," Microprocessing and Microprogramming, vol. 35, No. 1 / 05, Sep. 1, 1992, pp. 563–569.

Agesen, O. and Hölzle, U., "Type Feedback vs. Concrete Type Inference: A Comparison of Optimization Techniques for Object–Oriented Languages," *OOPSLA '95 Conference Proceedings*, Austin, Texas. 1–17 1995.

Aho, A.V. et al., "A Simple One–Pass Compiler," *Compilers, Principles, Techniques, and Tools*. Reading: Addison–Wesley Publishing Company. 23–81 1986.

Aho, A.V. et al., "Introduction to Compiling," *Compilers, Principles, Techniques, and Tools*. Reading: Addison–Wesley Publishing Company. 1–23 1986.

Chambers, C. et al., "An Efficient Implementation of SELF, a Dynamically–Typed Object–Oriented Language Based on Prototypes," *Lisp and Symbolic Computation*. 4: (3) 57–95 1991.

Chambers, C. and Ungar D., "Customization: Optimizing Compiler Technology for SELF, a Dynamically–Typed Object–Oriented Programming Language," *PLDI*. 146–160 1989.

Chambers, C. and Ungar, D., "Iterative Type Analysis and Extended Message Splitting: Optimizing Dynamically–Typed Object–Oriented Programs," *Lisp and Symbolic Computation*. 4: (3) 97–124 1991.

Hölzle, U. and Ungar, D., "A Third–Generation SELF Implementation: Reconciling Responsiveness with Performance," *OOPSLA '94 Conference Proceedings*, Portland, Oregon. 1–15 1994.

(List continued on next page.)

*Primary Examiner*—Tariq R. Hafiz
*Assistant Examiner*—Anil Khatri
*Attorney, Agent, or Firm*—Park & Vaughan LLP

[57] ABSTRACT

Apparatus, methods, and computer program products are disclosed for providing optimized access to pointer or externally-tagged primitive type data-values. The invention maintains a type identifier external to the variable that contains the data-value. The invention determines the type distribution of data-values stored in the variable and optimizes access to the variable accordingly. Some of these optimizations are targeted towards called routines and the call sites for the called routines. Other optimizations are targeted towards object-oriented programming language implementations. These optimizations generate optimized versions of a class/map. Objects are linked to the optimized versions of the class/map depending on the type configuration of the data-values stored in the object. Thus, the invention optimizes access to variables in the object when the object contains commonly used type configurations.

27 Claims, 9 Drawing Sheets

OTHER PUBLICATIONS

Hölzle, U., "Adaptive Optimization for Self: Reconciling High Performance with Exploratory Programming," a Dissertation submitted to the Stanford University Department of Computer Science. 1–164 1995.

Hölzle, U., "Optimizing Dynamically–Dispatched Calls with Run–Time Type Feedback," *SIGPLAN Conference on Programming Language Design and Implementation*, Orlando, FL. 1–11 1994.

Ungar, D. et al., "Objcet, Message, and Performance: How they coexist in SELF," *IEEE Computer*. 25: (10) 1–21 1992.

Ungar, D. and Smith, R.B., "Self: The Power of Simplicity," published in Sun Microsystems Laboratories *SMLI Technical Report Series* 1–18 1994.

Van Der Linden, P., "Java Language Specifics, " *Not Just Java*. Mountain View: Sun Microsystems Press. 136–149 1997.

Wismuller, "Debugging of globally optimized programs using data flow analysis", ACM SIGPLAN, pp. 278–289, Jun. 1994.

Dean et al., "Vortex: an optimizing computer for object oriented languages", ACM OOPSLA, pp. 83–100, 1996.

Kandemir et al, "A compiler algorithm for locality in loop nests", ACM ICS, pp. 269–276, May 1997.

Bershad et al., "Avoiding conflict misses dyanmically in large direct mapped caches", ACM ASPLOS VI, pp. 158–170, Oct. 1994.

Engelen et al, "Incorporating application development information in an automatic code generating environment", ACM ICS, pp. 180–187, 1997.

Shao et al., "A type based compiler for standrad ML", ACM SIGPLAN, pp. 116–129, Feb. 1995.

Holzle & Ungar, "Reconciling Responsiveness with performance in pure object oriented languages", ACM Trans. Prog. Lang. & Syst. vol. 18, No. 4, pp. 355–400, Jul. 1996.

Ungar, David., "Annotating objects for transport to other world", OOPSLA '95 ACM, pp. 73–87, 1995.

Agesen & Ungar, "Sifting out the Gold: Delevering compact applications from an exploratory object oriented programming environment", OOPSLA, ACM, pp. 355–370, Oct. 1994.

METHOD AND APPARATUS FOR EFFICIENT OPERATIONS ON PRIMARY TYPE VALUES WITHOUT STATIC OVERLOADING

BACKGROUND OF THE INVENTION

1. Field of the Invention

This invention relates to the field of computer programming languages. Specifically, this invention is a new and useful method, apparatus, and computer program product for implementing programming languages.

2. Background

A computer's central processing unit (CPU) is designed to execute computer instructions that perform operations on data-values. These data-values are generally stored in variables in memory and in the CPU's registers. Most general purpose computers have specialized instructions for operating on data-values of specific primitive types. These primitive data-value types include, without limitation, integer, byte, floating point and pointer types. Programming language compilers often allow these primitive types to be aggregated into structured and object types.

Compilers read an input program written in one language and generate an output program constructed to be executed according to an application binary interface (ABI). That is, the output program is usually a sequence of computer instructions that can be executed by the CPU. Programming languages and their compilers are designed to provide the programmer with flexibility in describing the operations that the computer executing the compiled program is to perform while balancing the need for generating an efficient output program. One language design trade-off is whether the type of the data-value is associated with the data-value itself or with the variable that stores the data-value.

Many compilers associate the data-value's type with the variable. These compilers perform static type checking at compile time to assure that only data-values of the appropriate type are stored into the variable. For example, only integer data-values are stored in an integer variable. The compiler will generate a compiler error if the programmer inadvertently instructs the program to store a non-integer data-value in the integer variable. The compiler can generate efficient code because the compiler knows the type of the data stored in a variable and only needs to generate the correct computer instruction to access the variable.

Other compilers associate data-value's type with the data-value itself. Thus, the data-value can be stored in a general purpose variable (a slot). The executing program first examines the data-value's type and then selects the appropriate computer instruction(s) to perform the operation on the data-value. This run-time type checking and operation dispatch imposes significant overhead in the resulting output program. The type of the data value is either stored in the same variable as the data-value (thus tagging the data-value and reducing the number of bits available in the variable for storing the data-value) or is stored in a type identifier associated with, but external to, the variable (an externally tagged data-value).

Object-oriented programming (OOP) languages associate an object's data with OOP methods for operating on that object's data. Usually, OOP objects are instantiated in a heap memory area and are based on class/maps that reference the programmed methods for the OOP object. Instantiated OOP objects are accessed through pointers and contain data (in instance variables) specific to that particular instantiated OOP object. Conceptually, an OOP object contains object-related information (such as the number of instance variables in the object), the instance variables, and addresses of called routines (OOP methods) that access and/or manipulate the contents of the instance variables in the object. However, because objects often share called routines and object-related information, this shared information is usually extracted into a class/map. Thus, the instantiated object simply contains its instance variables and a pointer to its class/map.

Pure object-oriented languages tend to have a data-value's type associated with the data-value. Traditional programming languages have data-value's type associated with the variable. These languages perform static type checking. Some object-oriented programming languages have taken a hybrid approach and associate primitive types with the variable (static type checking) and objects types with the data-value (dynamic type checking). These hybrid languages are efficient, but do not provide all of the advantages of a pure object-oriented implementation.

TABLE 1

```
class truck {
    void CrashInto (truck n) {System.out.println("crunch");}
}
class fueltruck extends trucks {
    void CrashInto (fueltruck n) {System.out.println("kaboom");}
}
public class test {
    public static void main(String[ ] args) {
        truck t1 = new fueltruck();
        truck t2 = new fueltruck();
        t1.CrashInto(t2);
    }
}
```

One difficulty with hybrid OOP languages results from the characteristic that an instance of a subclass/map can be substituted for an instance of a superclass/map. Because a subclass/map can provide alternate OOP method implementations (alternate called routines), static type checking cannot, in general, determine if a single method will be invoked at runtime. At runtime the executing program must dynamically determine which called routine to invoke. For primitive types, the executing program determines which called routine to invoke based solely on the static types of the arguments and results passed to and from the called routine. The static rules that determine which called routine to invoke may conflict with the dynamic rules used for objects. For example, in the Java code fragment shown in Table 1, the Java compiler is unable to determine which CrashInto method the programmer intended to invoke and because variable t1 was typed as truck, the compiler uses truck's CrashInto method instead of fueltruck's CrashInto method. Thus, when the code in Table 1 is executed it prints out "crunch" instead of the "kaboom" intended by the programmer.

If Java would have associated the type with the data-value stored in the t1 variable instead of with the t1 variable itself, this code would have performed as the programmer intended because the type of the data-value stored in t1 would have been determined at run time instead of at compile time and the fueltruck's CrashInto method would have been called instead of the truck's CrashInto method.

Smalltalk, Self, Java and C++ are examples of OOP languages. Smalltalk was developed in the Learning Research Group at Xerox's Palo Alto Research Center (PARC) in the early 1970s. Self was developed by Randall B. Smith and David Ungar at Xerox's PARC in 1987. C++ was developed by Bjarne Stroustrup at the AT&T Bell Laboratories in 1983 as an extension of C. Java is an OOP language with elements from C and C++ and includes highly tuned libraries for the internet environment. It was developed at SUN Microsystems and released in 1995.

Further information about OOP concepts may be found in *Not Just Java* by Peter van der Linden, Sun Microsystems Press/Prentice Hall PTR Corp., Upper Saddle River, N.J., (1997), ISBN 0-13-864638-4, pages 136–149.

To summarize, existing hybrid-object-oriented programming languages, although efficient, are confusing to use because of the conflicts between the static and dynamic typing rules. On the other hand, pure-object-oriented programming languages that have internally tagged primitive types are inefficient.

It would be advantageous to implement a pure-object-oriented programming language that addresses the previously discussed problems with the prior art. In particular, it would be advantageous to develop a pure-object-oriented programming language environment that uses externally-tagged primitive types as primitive objects and that optimizes access to these objects.

SUMMARY OF THE INVENTION

The invention provides a method, apparatus, and computer program product for optimizing computer operations on data-values of a pointer or externally tagged primitive data type. The invention maintains a type identifier associated with a variable that indicates the type of the data-value stored in the variable. The invention determines the type usage pattern for the data-values stored in the variable and accordingly optimizes some of the computer instructions used to access the variable.

One aspect of the invention is a computer controlled method for optimizing computation on a plurality of typed data-values stored in a variable. Each of the plurality of typed data-values independently has a type that is either a pointer type or an externally-tagged primitive type. The method includes the step of maintaining, external to the variable, a type identifier that indicates the type of the variable's contents. The method also includes the steps of determining a type usage pattern and of optimizing access to the variable dependent on the type usage pattern.

Another aspect of the invention is an apparatus having a central processing unit (CPU) and a memory coupled to said CPU. The apparatus optimizes computation on a plurality of typed data-values stored in a variable. Each of the plurality of typed data-values independently has a type that is either a pointer type or an externally-tagged primitive type. The apparatus includes a type maintenance mechanism that is configured to maintain, external to the variable, a type identifier indicating the type of the variable's contents. The apparatus also includes a type usage determination mechanism that is configured to determine a type usage pattern that depends the type maintenance mechanism. A first optimization mechanism is configured to optimize access to the variable dependent on the type usage pattern.

Yet a further aspect of the invention is a computer program product embedded on a computer usable medium for optimizing computation on a plurality of typed data-values stored in a variable. When executed on a computer, the computer readable code causes a computer to effect a type maintenance mechanism, a type usage determination mechanism, and a first optimization mechanism. Each of these mechanisms having the same functions as the corresponding mechanisms for the previously described apparatus.

The foregoing and many other aspects of the present invention will no doubt become obvious to those of ordinary skill in the art after having read the following detailed description of the preferred embodiments that are illustrated in the various drawing figures.

DESCRIPTION OF THE PREFERRED EMBODIMENTS

Notations and Nomenclature

Figure 1:
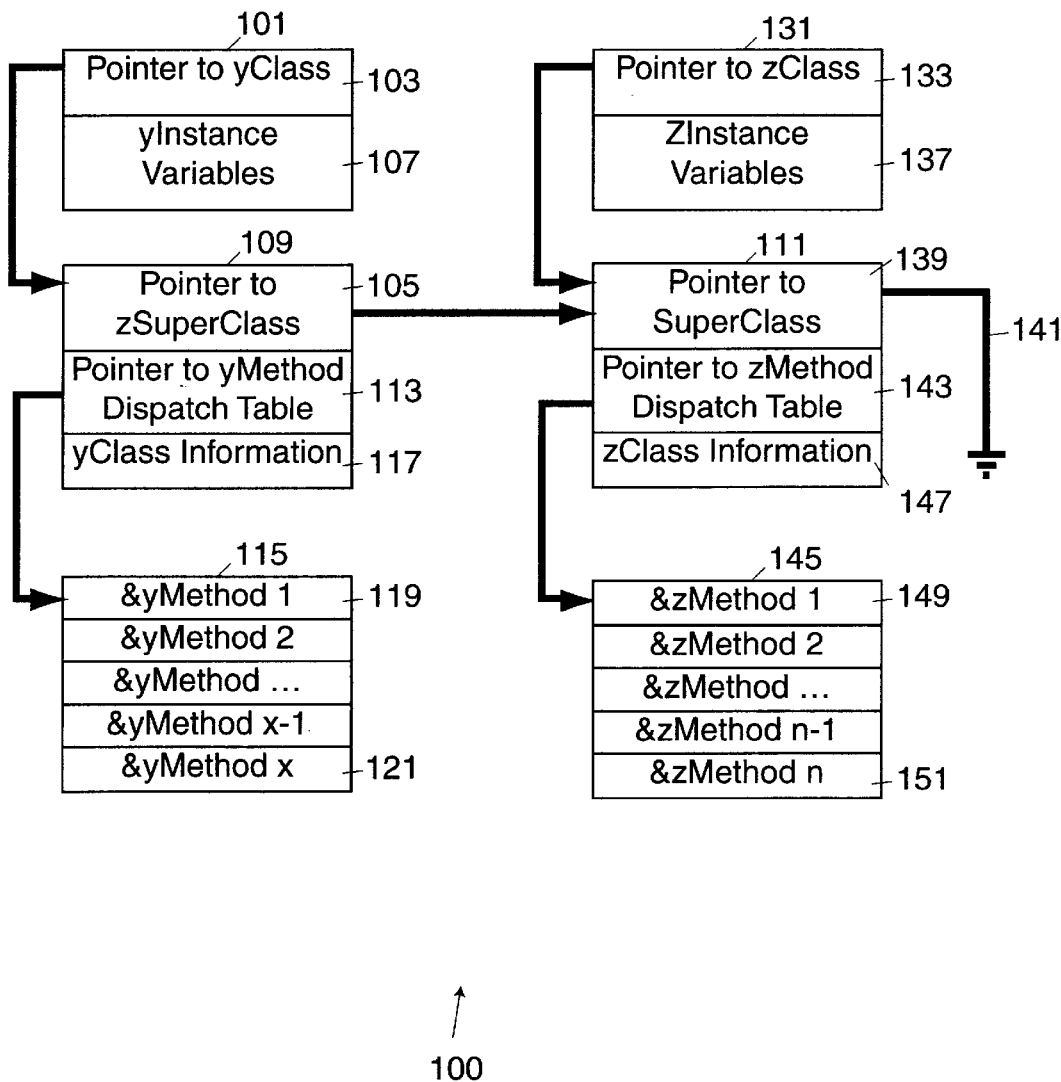
FIG. 1 illustrates a typical prior art object-class/map data structure.

The following 'notations and nomenclature' are provided to assist in the understanding of the present invention and the preferred embodiments thereof.

Access—Access to a variable includes both a read access and a write access or any combination of read/write access to retrieve a data-value from, or store a data-value into the variable.

Activation record—An activation record contains information needed by a single execution of a called routine. Generally, the call site pushes a portion of the activation record onto the run-time stack just prior to invoking the called routine. The called routine may add to the activation record to reserve space for the called routine's variables. The activation record is popped from the run-time stack as the called routine completes.

Called routine—A called routine is an OOP method (or similar procedure) that is invoked from a call site, performs an operation and returns to the call site. The called routine may receive arguments passed by the call site. It may also return values.

Call site—A call site is the procedure used to invoke a called routine.

Class/map—The class/map is an OOP language's implementation that records information common to a set of objects instantiated from the same class or copied from other objects. One skilled in the art will understand that this data structure may or may not be the same data structure used to represent classes used by the programming language's implementation.

Data type—The type of the data-value. The data type is either associated with the data-value itself, or with the variable that contains the data-value. There are primary types (for example integer and real) and constructed types (such as those defined by data structures). Some variables store data-values of only one type. These variables are immutable type variables (all staticly typed variables are immutable type variables). Mutable type variables store data-values of different types. Data-values that are of an untagged primitive type have no intrinsic type information available to the executing program. Data-values that are of a tagged primitive type include intrinsic type information within the memory field used to store the data-value itself. Externally tagged primitive types store the type information separately from the data-value itself. Information from both tagged and externally tagged data types are available to the executing program.

Data-value—The data-value is a pattern of bits that have a meaning that depends on the data type associated with the data-value.

Dynamic compilers—Dynamic compilers compile the source program while the program is executing. Static compilers (such as FORTRAN, Pascal, C, and other traditional computer language compilers) compile the source into a deterministic target language independent of the execution sequence and subject to user specified compilation preferences. A general discussion of static compilers can be found in *Compilers: Principles, Techniques and Tools* by Alfred V. Aho, Ravi Sethi and Jeffrey D. Ullman, Addison-Wesley Publishing Co.® 1988, ISBN 0-201-10088-6. A brief overview of dynamic compilers can be found at page 9 of *Adaptive Optimization for Self: Reconciling High Performance with Exploratory Programming*, by Urs Hölzle, Sun Microsystems Laboratories, SMLI TR-95-35,® 1995.

Externally tagged primitive type—see "Data type."

Preferred type—A preferred type is a high occurrence type in a mutable type data-value. For example, a variable may predominately contain integer data-values but sometimes contain non-integer data-values. Access to the variable can be optimized with respect to the preferred type while still supporting the non-preferred types by using generalized access. One Preferred type is an immutable type. Mutable types can be preferred types depending on the number of different types of data-values stored in the variable and on the relative frequency of use of the data-values of each type.

Primary type—Data-values are typed. The primary types (basic types) are atomic types that have no internal structure as far as the programmer is concerned. Primary types are often dependent on the programming language but generally relate to the capability of the computer's instructions. Generally, primary types include (among others): integer, real, pointer, boolean and character types.

Procedure—A self-consistent sequence of steps leading to a desired result. These steps are those requiring physical manipulation of physical quantities. Usually these quantities take the form of electrical or magnetic signals capable of being stored, transferred, combined, compared, and otherwise manipulated. These signals are referred to as bits, values, elements, symbols, characters, terms, numbers, or the like. It will be understood by those skilled in the art that all of these and similar terms are associated with the appropriate physical quantities and are merely convenient labels applied to these quantities.

Static compiler—see "Dynamic Compiler."

Tagged primitive type—see "Data type."

Untagged primitive type—see "Data type."

Overview

The manipulations performed by a computer in executing computer instructions are often referred to in terms, such as adding or comparing, that are commonly associated with mental operations performed by a human operator. In the present invention no such capability of a human operator is necessary in any of the operations described herein. The operations are machine operations. Useful machines for performing the operations of the invention include programmed general purpose digital computers or similar devices. In all cases the method of computation is distinguished from the method of operation in operating a computer. The present invention relates to method steps for operating a computer in processing electrical or other (e.g., mechanical, chemical) physical signals to generate other desired physical signals.

The invention also relates to apparatus for performing these operations. This apparatus may be specially constructed for the required purposes or it may comprise a general purpose computer as selectively activated or reconfigured by a computer program stored in the memory of a computer. The procedures presented herein are not inherently related to a particular computer or other apparatus. In particular, various general purpose machines may be used with programs written in accordance with the teachings herein, or it may prove more convenient to construct more specialized apparatus to perform the required method steps. The required structure for a variety of these machines will appear from the following description. Also, the invention may be embodied in a computer readable storage medium encoded with a program that causes a computer to perform the programmed logic.

FIG. 1 illustrates a typical prior art object-class/map data structure, indicated by general reference character 100, used to associate objects and class/maps. A 'y object' structure 101 contains information that is specific to a particular instantiation of an object belonging to the 'y' class/map. The 'y object' structure 101 contains a 'y class/map pointer' storage 103. The 'y class/map pointer' storage 103 contains a pointer to a 'y class/map' structure 105. The 'y object' structure 101 also contains a 'y instance variable' storage 107. The 'y instance variable' storage 107 contains the instance variables for the 'y object' structure 101.

The 'y class/map' structure 105 contains a 'superclass/map pointer' storage 109 that contains a pointer to a 'z class/map' structure 111 that is the parent class (or superclass) of the 'y class/map' structure 105. The 'y class/map' structure 105 also includes a 'y method dispatch structure pointer' storage 113 that contains a pointer to a 'y method dispatch' structure 115. In addition, the 'y class/map' structure 105 includes a 'y class/map information' storage 117 that contains other information that is specific to the 'y' class/map. The 'y method dispatch' structure 115 contains storage for pointers to called routines that implement the class/map methods.

A particular class/map has a specific number of methods. A 'first method pointer' storage 119 contains the address of (pointer to) the called routine that implements the first method for the 'y' class/map. A 'last ymethod pointer' storage 121 contains the address of the called routine that implements the last method for the 'y' class/map. If a method is invoked on the 'y object' structure 101, and the 'y' class/map does not include the method (as determined by the information in the 'y class/map information' storage 117), the method invoking mechanism follows the pointer in the 'superclass/map pointer' storage 109 to determine whether the invoked method belongs to a superclass/map of the 'y' class/map.

A 'z object' structure 131 contains information that is specific to each instantiation of an object of the 'z' class/map. The 'z object' structure 131 contains a 'z class/map pointer' storage 133 that contains a pointer to the 'z class/map' structure 111 and a 'z instance variable' storage 137. The 'z class/map' structure 111 contains a 'superclass/map pointer' storage 139. The 'z instance variable' storage 137 contains the instance variables for the 'z object' structure 131. The 'superclass/map pointer' storage 139 in the illustrated structure contains a NIL pointer indicated by a 'NIL pointer' indicator 141. The NIL pointer in the 'superclass/map pointer' storage 139 indicates that the 'z class/map' structure 111 is not derived from a superclass/map.

The 'z class/map' structure 111 also includes a 'z method dispatch structure pointer' storage 143 that contains a pointer to a 'z method dispatch' structure 145. In addition, the 'z class/map' structure 111 also includes a 'z class/map information' storage 147 that contains other information that is specific to the 'z' class/map. The 'z method dispatch' structure 145 contains storage for pointers to called routine that implement the z class/map methods such as a 'first zmethod pointer' storage 149 and a 'last zmethod pointer' storage 151.

Thus, each object 101, 131 contains information relevant to that particular object. In addition, method procedures are shared between objects belonging to the same class/map. Further, methods procedures are shared between class/maps and superclass/maps.

The invention detects whether the variable is type immutable, whether the data-values stored in the variable have a preferred type, or whether the data-values stored in the variable do not have a preferred type. The first case is whether data-values stored in a variable all have the same type. Once this is determined, a compiler appropriately optimizes the procedures that access the variable. If the variable is type immutable this optimization generates code that assumes that the variable contains a data-value of that type. The second case is whether the variable has a preferred type. If the variable has a preferred type the compiler optimizes code for procedures and call sites that access that variable for that type while still providing support for the non-preferred types. These optimizations apply to procedures that access the variable, to call sites that pass the variable or its contents to, or from, a called routine, and the called routine itself. The third case is when the variable does not have a preferred type. If the variable does not have a preferred type the compiler need not optimize the code for any type but may optimize the code for one or more default types.

The invention also monitors the types of data-values stored in an object's instance variables. If the data-value type changes in the instance variable, the invention can relink the object's class/map pointer to a class/map that has been optimized to process an instance variable of that new type.

Dynamic compilers can use run-time information to optimize the code that accesses a variable if the compiler can determine (while the program is executing just prior to compilation of the code) that a typed data-value of a given type will always be, or will often be, stored in a particular variable.

Operating Environment

Figure 2:
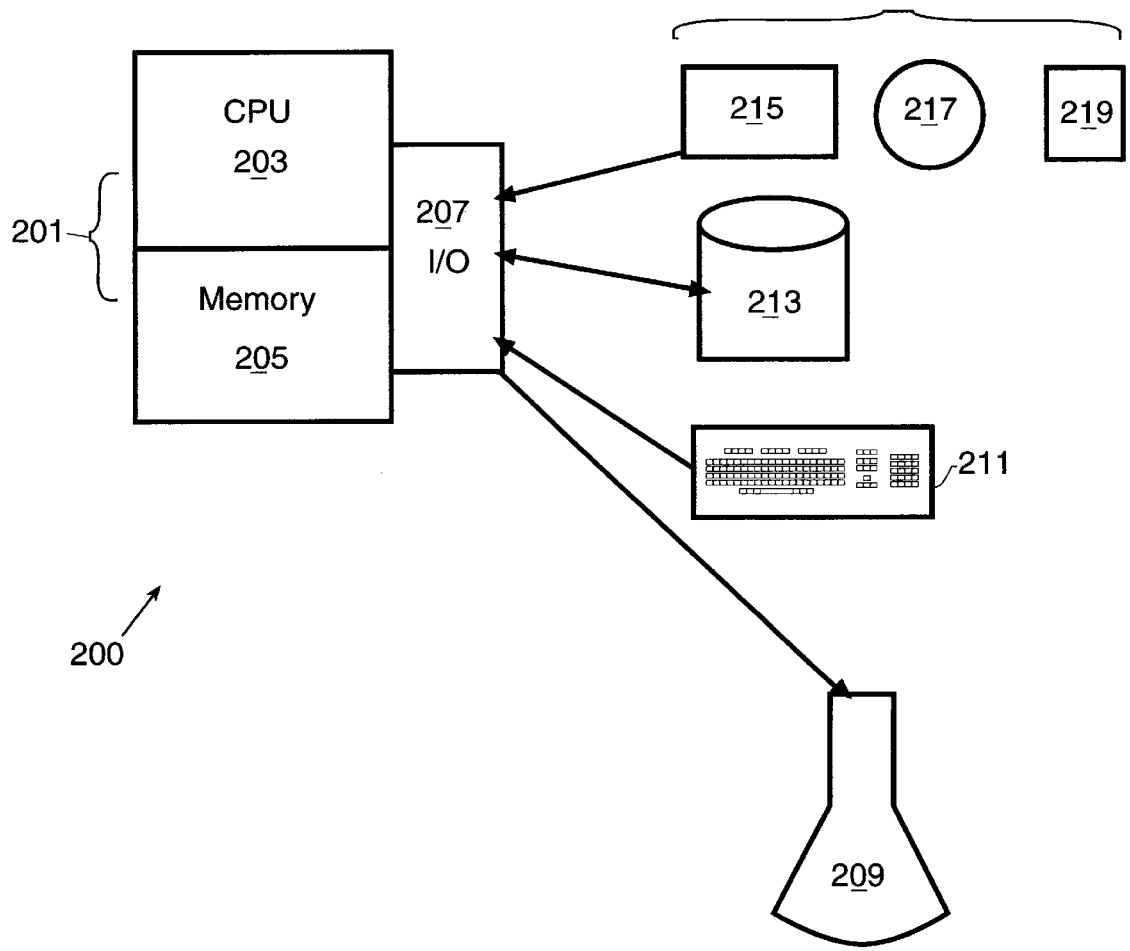
FIG. 2 illustrates a computer system capable of using the invention in accordance with a preferred embodiment.

Some of the elements of a computer, as indicated by general reference character 200, configured to support the invention are shown in FIG. 2 wherein a processor 201 is shown, having a central processor unit (CPU) 203, a memory section 205 and an input/output (I/O) section 207. The I/O section 207 is connected to a display unit 209, a keyboard 211, a disk storage unit 213 and a CD-ROM drive unit 215. The CD-ROM drive unit 215 can read a CD-ROM medium 217 that typically contains a program and data 219. The CD-ROM drive unit 215, along with the CD-ROM medium 217, and the disk storage unit 213 comprise a filestorage mechanism. Such a computer system is capable of executing applications that embody the invention.

Figure 3:
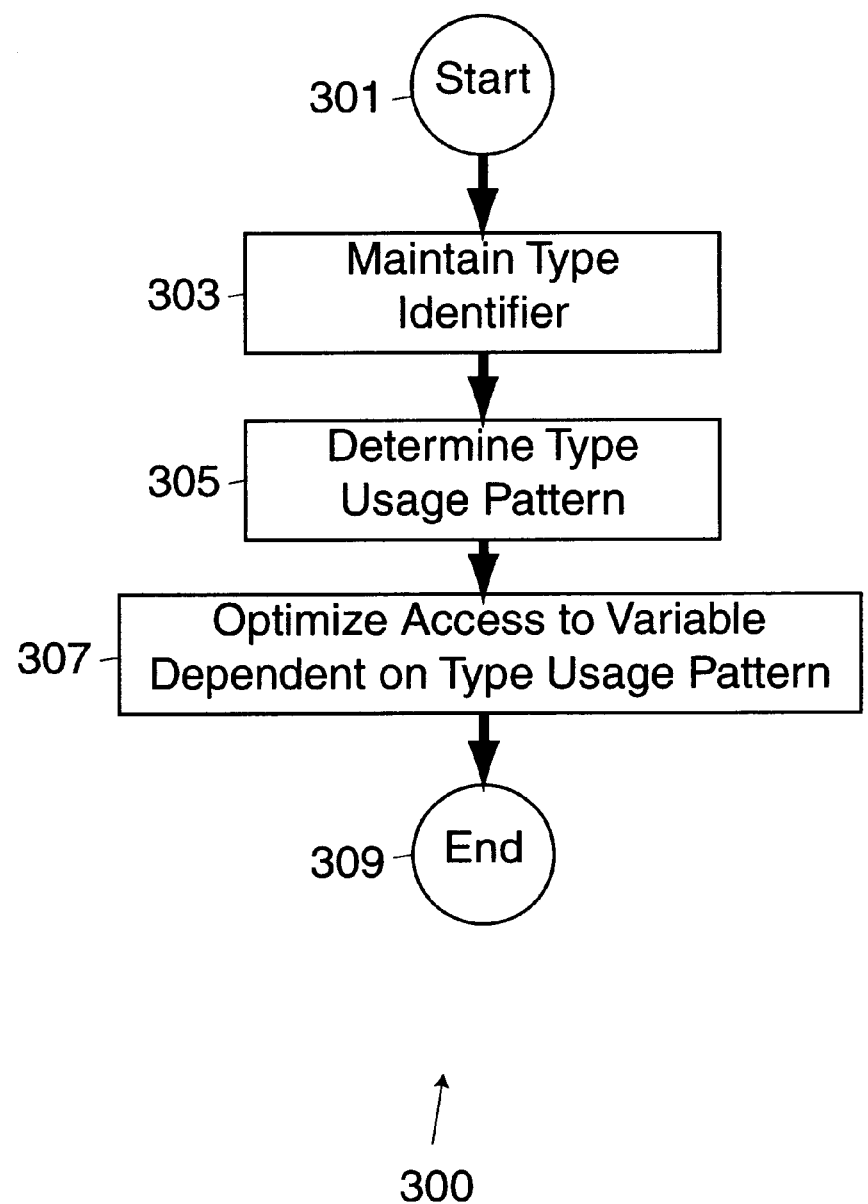
FIG. 3 illustrates an optimization process that optimizes access to variables in accordance with the preferred embodiments.

FIG. 3 illustrates an optimization process, indicated by general reference character 300, that initiates at a 'start' terminal 301 and continues to a 'maintain type identifier' procedure 303. In a dynamically compiled program environment the optimization process 300 is invoked when an uncompiled method is invoked. With a static compiler, the program is first profiled and the optimization process 300 is invoked during a subsequent compilation that utilizes the profiled data. The 'maintain type identifier' procedure 303 saves the type of a data-value stored in a variable in a type identifier associated with the variable. For example, the type identifier indicates when an integer data-value is stored in the variable. One skilled in the art will understand that some implementations of the invention use the type identifier to distinguish between a pointer and an integer. Other implementations use the type identifier to distinguish between a larger set of types (such as the pointer type and primary types). Next, a 'determine type usage pattern' procedure 305 evaluates the type mutability of the typed data-values stored in the variable. That is, the 'determine type usage pattern' procedure 305 determines whether only data-values having a specific type are stored in the variable. The typed data-values are type mutable if data-values of different types can be stored in the variable. However, if the stored data-values are of only one type the data-values are type immutable. This determination can be made from run-time data gathered by a profiler-instrumented program compiled by a static compiler or by a the run-time and compiler states of a program compiled by a dynamic compiler. The 'determine type usage pattern' procedure 305 also determines, for mutable data-values, which types are most used (the preferred types). Next, an 'optimize access to variable' procedure 307 optimizes the computer instructions used to access the data-value stored in the variable dependent on the results of the 'determine type usage pattern' procedure 305. The optimization process 300 completes through an 'end' terminal 309.

The specification discloses two preferred embodiments. One embodiment optimizes both a called routine and the site that invokes the called routine (the call site). Another embodiment optimizes OOP methods that access instance variables in an OOP object.

A first preferred embodiment optimizes both a called routine and the call site dependent on the types of the data-value passed from the call site to the called routine. Because data-values contained in passed entities (that is, the data-values contained in variables and/or the addresses of the variables themselves) can be specified as arguments to, or a result from, a called routine, the call site generally contains code to select which executable version of the called routine to invoke dependent on the types of the passed entities. The invention detects variables that have immutable types (from the 'determine type usage pattern' procedure 305) and optimizes both the called routine and the call site dependent upon the type-mutability of the passed entities. Additionally, if the variables have mutable types, the invention generates multiple versions of the called routine (each optimized for a preferred type as determined by the 'determine type usage pattern' procedure 305) that are invoked dependent on the types of the passed data-values. Often, one of these called routine versions is not optimized with respect to any of the passed data-values and so is capable of processing any pattern of types of the passed data-value. This embodiment applies to directly accessible typed data-values stored in variables within an activation record.

Figure 4A:
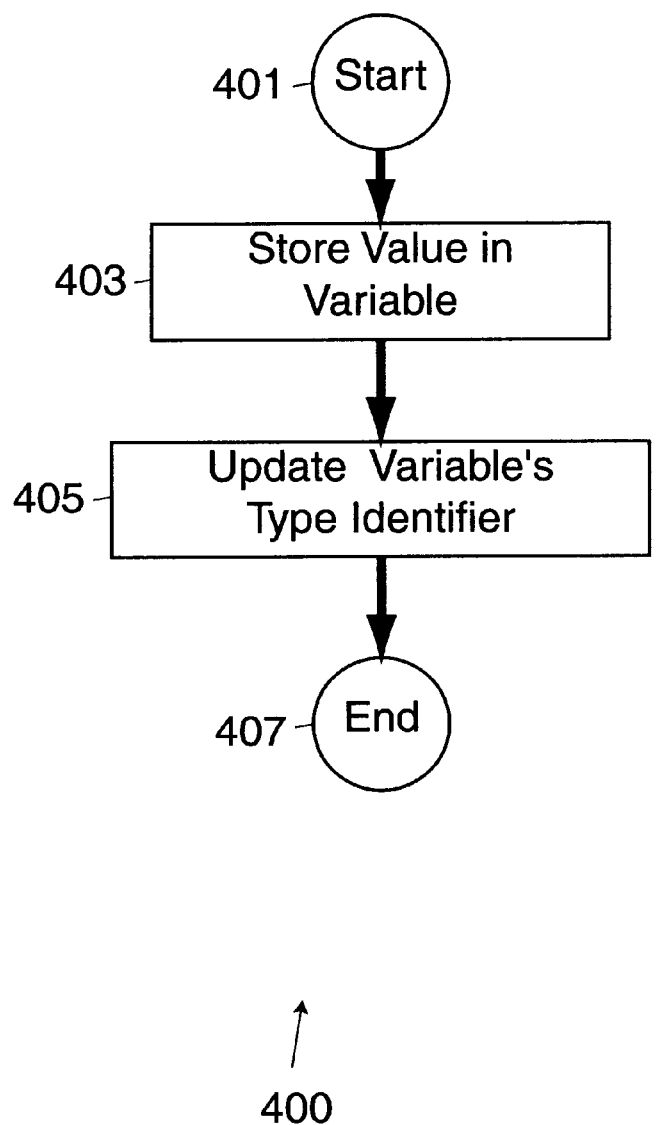
FIG. 4A illustrates a process for maintaining a type identifier for a variable in accordance with a first preferred embodiment.

FIG. 4A illustrates a 'maintain type identifier' process, indicated by general reference character 400, that is used by the first preferred embodiment and invoked by the 'maintain type identifier' procedure 303 of FIG. 3. The process 400 initializes at a 'start' terminal 401 and continues to a 'store data-value in variable' procedure 403 that stores a data-value in a variable. Because the data-value is typed and the variable is not typed, the process 400 also stores type information related to the just-stored data-value. An 'update type identifier' procedure 405 performs this operation. The stored type information is initially obtained from the data-value's previous variable and is maintained while the data-value was manipulated prior to the 'store data-value in variable' procedure 403. The process 400 then completes through an 'end' terminal 407.

Figure 4B:
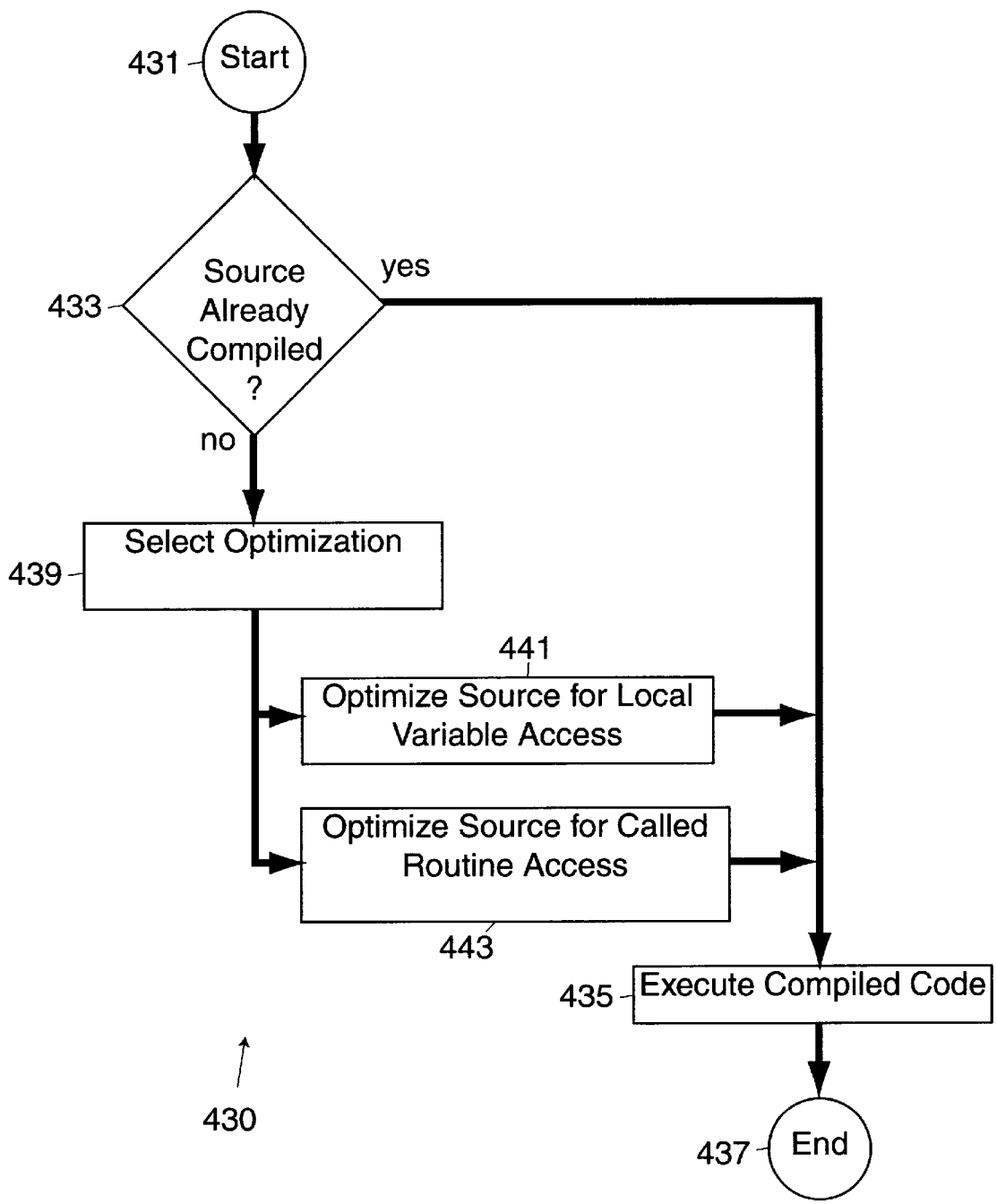
FIG. 4B illustrates a process for optimizing access to a variable by a called routine and a call site in accordance with the first preferred embodiment.

FIG. 4B illustrates an optimization process, indicated by general reference character 430, for a dynamic compiler utilizing the invention. The optimization process 430 initiates at a 'start' terminal 431 and continues to a 'source already compiled' decision procedure 433 that determines whether the program code to be executed has already been compiled. If the program code has been compiled, the optimization process 430 continues to an 'execute compiled code' procedure 435 that executes the previously compiled code and the optimization process 430 completes through an 'end' terminal 437. However, if the 'source already compiled' decision procedure 433 determines that the source has not already been compiled, the optimization process 430 continues to a 'select optimization' procedure 439. The 'select optimization' procedure 439 determines whether the source code will invoke a called routine to access the data-value (for example if the source code was "a=foo (a, b)"), or if the source code will compile so as to directly operate on the data-value (for example if the source code was "a=a+b"). An 'optimize source for local variable access' procedure 441 is invoked if the source code describes operations that, when compiled, will directly operate on the data-value. The 'optimize source for local variable access' procedure 441 determines whether the data-value is accessed from a variable that has a mutable type. One skilled in the art will understand that this determination is made from the run-time state of the executing program at the time of the compilation along with compiler generated information that relates to the syntax and semantics of the source program. If the type of the data-value stored in the variable is mutable, the 'optimize source for local variable access' procedure 441 compiles the source code to produce executable code capable of accessing and processing the data-value regardless of the type of the data-value. In addition the 'optimize source for local variable access' procedure 441 also generates executable code optimized to access data-values having a preferred type and the executable code to select which version of the executable code to execute based on the type of the data-values in the variable. However, if the type is immutable, the 'optimize source for local variable access' procedure 441 compiles the source optimized for only that specific type. Once these operations have been compiled the optimization process 430 completes through the 'end' terminal 437.

However if the 'select optimization' procedure 439 determines that the variable access is through a called routine, the optimization process 430 continues to an 'optimize source for called routine access' procedure 443. The 'optimize source for called routine access' procedure 443 determines whether the accessed variables are type immutable and, if so, optimizes both the called routine and the call site with respect to the immutable type (as is subsequently described with respect to FIG. 4C). If the accessed variables are type mutable, the 'optimize source for called routine access' procedure 443 determines the preferred data types passed between the called routine and the call site. It then generates a number of versions of called routines each optimized to process data-values having the preferred types. Next, the call site is modified to determine the type pattern of the arguments passed to the called routine and to invoke the corresponding optimized called routine. A general (not optimized dependent on the type pattern of the passed arguments) version of the called routine will be invoked if none of the optimized called routines match the type pattern of the passed arguments. Once the 'optimize source for called routine access' procedure 443 completes, the optimization process 430 completes through the 'end' terminal 437.

Figure 4C:
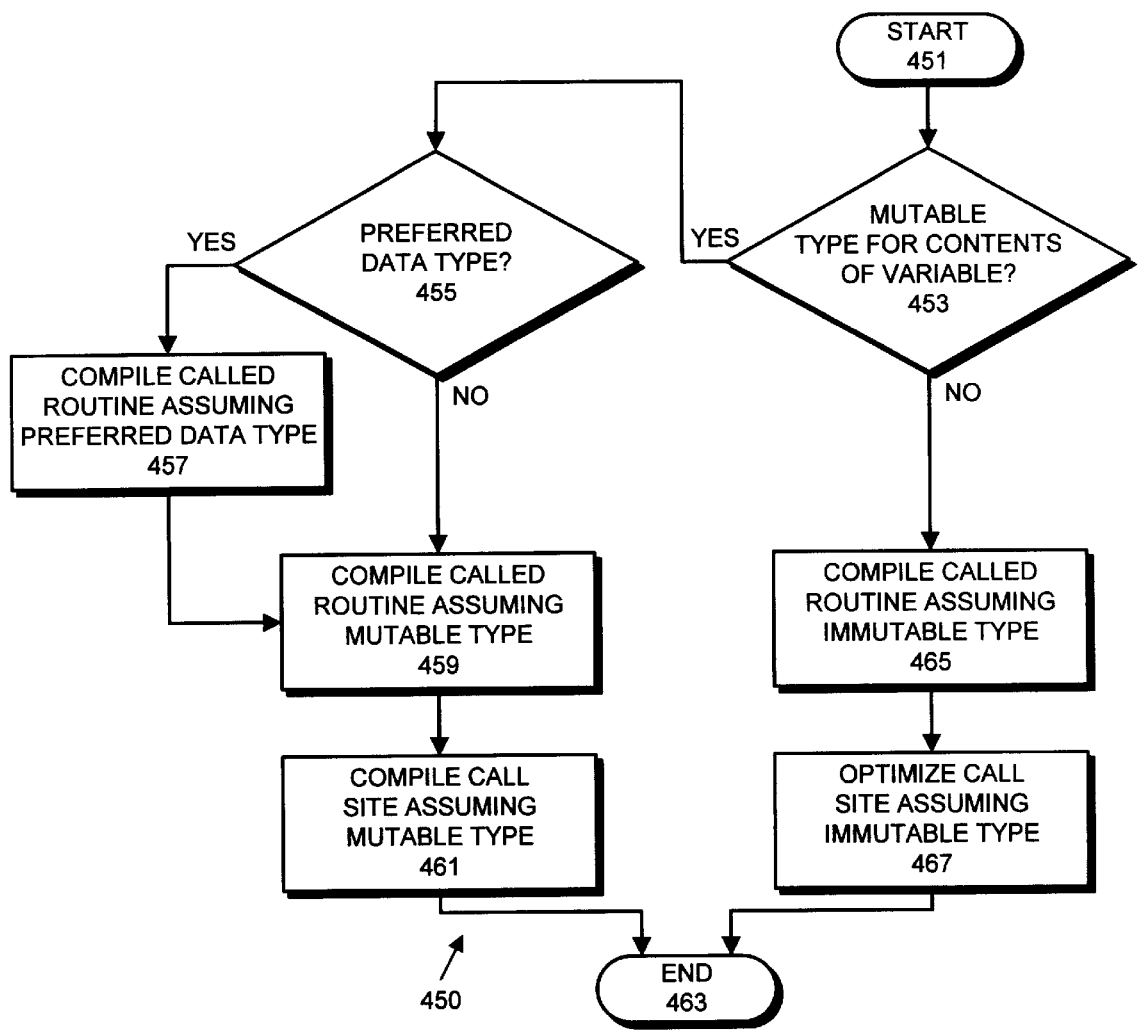
FIG. 4C illustrates a process for optimizing access to a variable in accordance with the first preferred embodiment.

FIG. 4C illustrates a called routine optimization process, indicated by general reference character 450, that is invoked by the 'optimize source for called routine access' procedure 443 of FIG. 4B. The called routine optimization process 450 initiates at a 'start' terminal 451 and continues to a 'mutable type variable' decision procedure 453 that determines which, if any, of the entities passed between the call site and the called routine are type-immutable. One skilled in the art will understand that this determination can be based on the run-time state of the executing program and the compiler information available from the dynamic compiler. If any of the passed entities are type-mutable, the called routine optimization process 450 continues to a 'preferred data type' decision procedure 455 that detects whether the variable has a preferred type. If the variable has a deferred type, the called routine optimization process 450 continues to a 'compile called routine for preferred data type' procedure 457 that compiles a version of the called routine optimized for a selection of the preferred data types. Next a 'compile called routine for mutable type' procedure 459 compiles a generalized version of the called routine for processing type-mutable passed entities. Then a 'compile call site for mutable type' procedure 461 compiles the call site to detect preferred data type patterns, select which optimized version of the called routine to invoke (or if no preferred data type pattern is detected to select the generalized version) and to pass and receive type-mutable entities from the called routine. Then the called routine optimization process 450 completes through an 'end' terminal 463.

However, if the 'mutable type variable' decision procedure 453 determines that the passed entities are type-immutable, the called routine optimization process 450 continues to a 'compile called routine for immutable type' procedure 465 that optimizes procedures within the called routine that access the type-immutable data-values. After the called routine is optimized, the called routine optimization process 450 continues to a 'compile call site for immutable type' procedure 467 that similarly optimizes the call site for the called routine. The process completes through the 'end' terminal 463.

The processes described in FIG. 4A, FIG. 4B and FIG. 4C optimize access to local type-immutable variables resulting from both the general operation of the program, accesses from the call sites for called routines and for accesses within the called routines themselves. Those skilled in the art will understand that (although the previously described preferred embodiment uses a dynamic compiler) equivalent results can be obtained by using profile data with a static compiler.

A second preferred embodiment optimizes OOP methods that access instance variables in an OOP object. This embodiment generates class/maps to optimized OOP methods. Conceptually, the invention provides a plurality of subclass/maps having, different optimizations of the class/map's methods. These optimizations are dependent upon the type-mutability and usage distribution of the instance variables of the object. When the type of the typed data-value stored in an instance variable changes, the object's class/map pointer is also changed to select a subclass/map (if one exists) that contains methods compiled to optimize access to instance variables containing data-values of the current type. The object's class/map pointer is changed to select a generalized method if no optimized method exists for a particular data-value type.

In the second preferred embodiment, the optimizations provided by the 'optimize access to variable' procedure 307 of FIG. 3 include optimizing access to indirectly accessible variables in memory. These variables are located in specific memory areas. These memory areas include a heap storage area, a data structure, or a node.

Figure 5A:
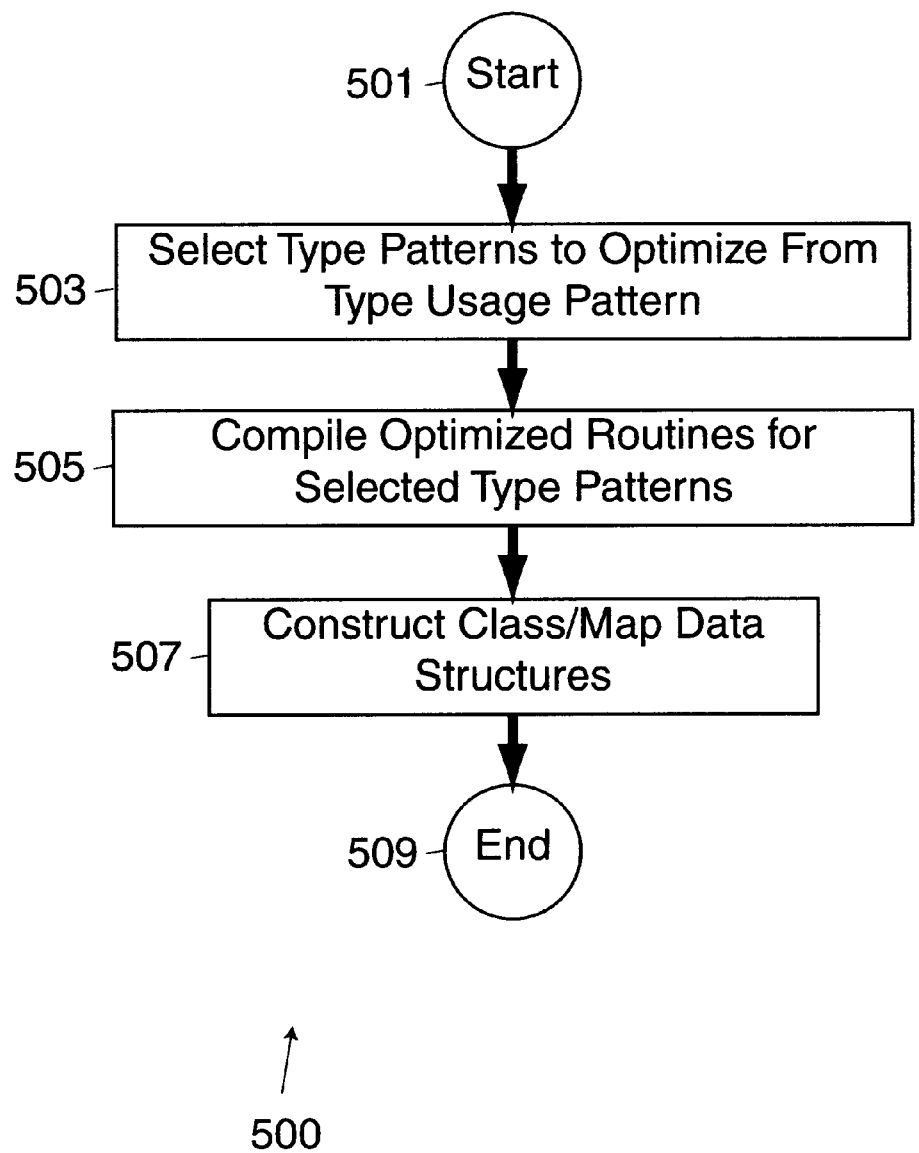
FIG. 5A illustrates a process used to construct an optimized class/map data structure in accordance with a second preferred embodiment.

FIG. 5A illustrates a process used to construct a class/map data structure, indicated by general reference character 500, that constructs a class/map data structure that enables optimized processing for objects having specific data-value type usage patterns in the objects' instance variables. The construct class/map process 500 initiates at a 'start' terminal 501 and continues to a 'select type usage pattern to optimize' procedure 503. The 'select type usage pattern to optimize' procedure 503 uses type usage information to determine what type usage patterns are most used in the objects belonging to the class/map. For example, if the class/map defines that each instantiated object has three variables (x, y, z), the 'select type usage pattern to optimize' procedure 503 determines which patterns of data-value types are most often stored in the three data variables. Thus, if x held an integer for 80% of its usage, and a pointer for 20% of its usage; and y held an integer for 70% and a real for 30% but was only used when x held an integer; and z always held a pointer; the type usage patterns that would be efficient to optimize would be the pattern of x and y an integer, and z a pointer; and x an integer, y a real and z a pointer. The type usage information is determined from run-time data. This run-time data can be gathered by using an execution profiler (with a static compiler) or by using the run-time information that is available to a dynamic compiler when it compiles the method.

Once the type usage patterns are selected, a 'compile optimized routines for selected type usage patterns' procedure 505 compiles and caches versions of the routine optimized for the data-value types determined by the 'select type usage pattern to optimize' procedure 503. In addition, the 'compile optimized routines for selected type usage patterns' procedure 505 compiles a generalized version of the routine that has the capability of handling any general data-value type usage pattern. This generalized version of the routine explicitly determines the type of the data-values in the object before operating on them Next, a 'construct class/map data structure' procedure 507 generates a class/map data structure that enables objects, having a type usage pattern that match those determined by the 'select type usage pattern to optimize' procedure 503, to access the optimized routines. The construct class/map process 500 completes through an 'end' terminal 509.

Figure 5B:
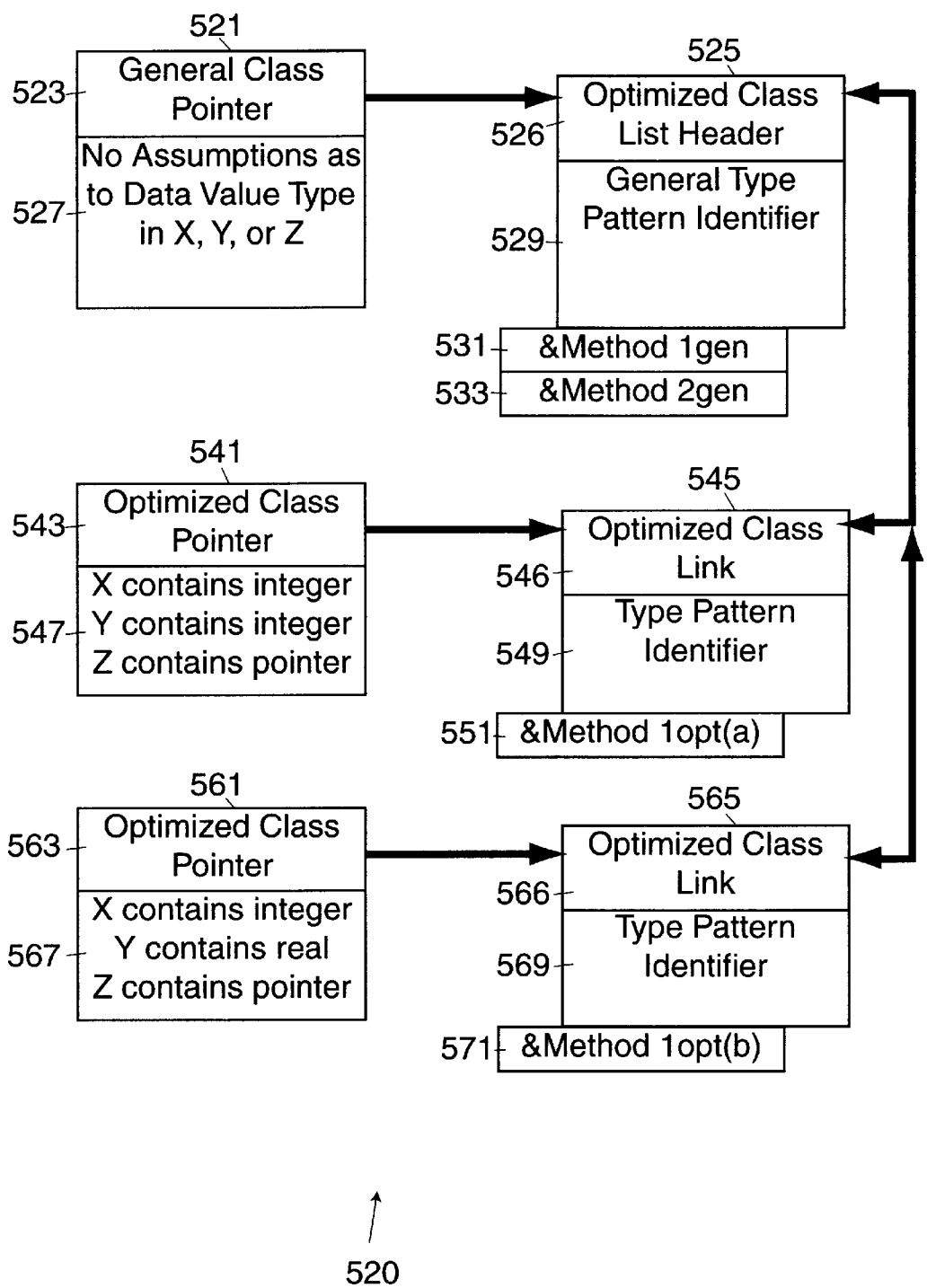
FIG. 5B illustrates an object-class/map data structure in accordance with the second preferred embodiment.

FIG. 5B illustrates a preferred embodiment of a class/map data structure 520 generated by the construct class/map process 500 of FIG. 5A. The class/map data structure 520 includes a 'first object' structure 521 that contains a 'general class/map pointer' storage 523 that points to a 'general class/map' structure 525. The 'general class/map' structure 525 includes an 'optimized class/map' list header 526 that is a bi-directional list header that links the optimized versions of the 'general class/map' structure 525. The 'first object' structure 521 is an instantiated object that includes a variable storage 527. For the 'first object' structure 521 shown in FIG. 5B the variable storage 527 contains storage for an x, y, and z variable. The variables in the variable storage 527 can contain any data-value type. Thus, a general type pattern identifier 529 indicates that the 'general class/map' structure 525 is applicable to any data-value type combination held in the instance variables. The 'general class/map' structure 525 also contains, or references, pointers to methods. In particular, the 'general class/map' structure 525, shown in FIG. 5B, contains a 'method 1 general' pointer 531 and a 'method 2 general' pointer 533. The relevant aspect of the methods pointed to by these pointers is that they process the data-values stored in the variable storage 527 regardless of the data-value's types.

The class/map data structure 520 also contains a 'first optimized object' structure 541 that contains a 'first optimized class/map pointer' storage 543 that points to a 'first optimized class/map' structure 545. The 'first optimized class/map' structure 545 contains an 'optimized class/map' link 546 that provides access to the bi-directional list headed by the 'optimized class/map' list header 526. The 'first optimized object' structure 541 also contains a variable storage 547 that contains storage for the x, y, and z variables for this particular instantiation of the object. The 'first optimized object' structure 541 currently contains an integer data-value in the x and y variables and a pointer in the z variable. As previously discussed, this data-value type configuration is one that allows the class/map methods to be optimized. The 'first optimized class/map' structure 545 contains a 'first type pattern' identifier 549 that indicates that the 'first optimized class/map' structure 545 is optimized to process objects (such as defined by the 'first optimized object' structure 541) that contain an integer data-value in the x and y variables and a pointer in the z variable. In addition, the 'first optimized class/map' structure 545 includes a 'first method 1 optimized' pointer 551 that is a pointer to a called routine that has been optimized to process an object having instance variables containing data-values of specific types in this specific configuration. As is understood by one skilled in the art, if 'method 2' is invoked on the 'first optimized object' structure 541 the actual method that executes will be the one accessed through the 'method 2 general' pointer 533. This is because the 'first optimized class/map' structure 545 does not include an optimized "method 2" so the "method 2" of the 'general class/map' structure 525 is used instead.

The class/map data structure 520 also contains a 'second optimized object' structure 561 that contains a 'second optimized class/map pointer' storage 563 that points to a 'second optimized class/map' structure 565. The 'second optimized class/map' structure 565 contains an 'optimized class/map' link 566 that provides access to the bi-directional list headed by the 'optimized class/map' list header 526. The 'second optimized object' structure 561 also contains a variable storage 567 that contains storage for the x, y, and z variables for this particular instantiation of the object. The 'second optimized object' structure 561 currently contains an integer data-value in the x variable, a real data-value in the y variable and a pointer in the z variable. As previously discussed, this data-value type configuration is one that allows the class/map methods to be optimized. The 'second optimized class/map' structure 565 contains a 'second type pattern' identifier 569 that indicates that the 'second optimized class/map' structure 565 is optimized to process objects (such as the 'second optimized object' structure 561) that contain an integer data-value in the x variable, a real data-value in the y variable and a pointer in the z variable. In addition, the 'second optimized class/map' structure 565 also includes a 'second method 1 optimized' pointer 571 that is a pointer to a called routine that has been optimized to process an object having instance variables containing data-values of specific types in this specific configuration.

Figure 6:
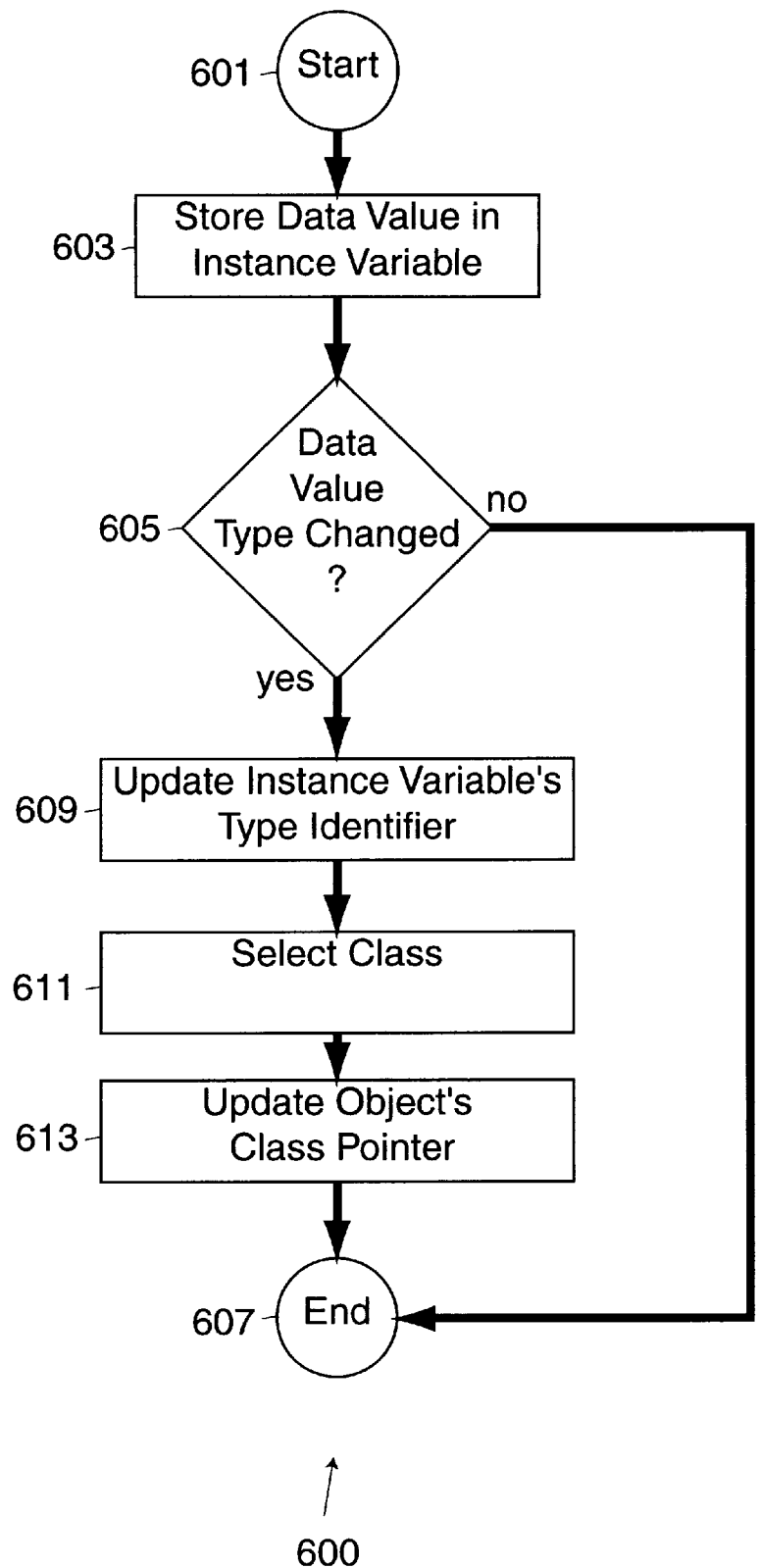
FIG. 6 illustrates a process for dynamically updating an object's class as data-values are stored in the object in accordance with the second preferred embodiment.

FIG. 6 illustrates an 'update instance variable' process, indicated by general reference character 600, that initiates at a 'start' terminal 601 and continues to a 'store data-value in instance variable' procedure 603. The 'start' terminal 601 stores a new data-value in an instance variable. Next, a 'data type in instance variable change' decision procedure 605 determines whether the data-value's type, of the newly stored data-value, is a different type than the previously stored data-value's type. If the previous and current data-value types are the same, the 'update instance variable' process 600 completes through an 'end' terminal 607 because the 'store data-value in instance variable' procedure 603 has not changed the type pattern for the instance variables in the object. One skilled in the art will understand that the 'data type in instance variable change' decision procedure 605 could be made to occur prior to the 'store data-value in instance variable' procedure 603 with equivalent results. If the 'data type in instance variable change' decision procedure 605 determines that the data-value's type changed in the variable, an 'update variable's type identifier' procedure 609 updates the instance variable's type identifier to reflect the type of the data-value stored in the instance variable. Next, a 'select class/map' procedure 611 searches the optimized class/maps (for example, using the bi-directional link to examine the 'first optimized class/map' structure 545 and the 'second optimized class/map' structure 565 of FIG. 5B) to determine whether an optimized class/map exists for the object's new type pattern. If no optimized class/map exists that matches the new type pattern, the general class/map is selected (for example, the 'general class/map' structure 525 of FIG. 5B). Once the appropriate class/map is selected, the 'update instance variable' process 600 continues to a 'update object's class/map pointer' procedure 613 that updates the object's class/map pointer to point to the selected class/map. Then the 'update instance variable' process 600 completes through the 'end' terminal 607. Thus, subsequent invocations of an object's methods will select optimized versions of the methods for commonly occurring variable type patterns but will use the generalized method for other variable type patterns.

One skilled in the art will understand that techniques other then the bi-directional linked list can be used to connect the optimized class/maps with the general class/map. Also one skilled in the art will understand that other aspects of this data structure can be modified and still be equivalent to the disclosed data structure.

One skilled in the art will understand that the invention as previously described teaches a method, apparatus and programming product that enables a pure object-oriented programming system to efficiently perform operations on variables containing data-values having a primary type.

Although the present invention has been described in terms of the presently preferred embodiments, one skilled in the art will understand that various modifications and alterations may be made without departing from the scope of the invention. Accordingly, the scope of the invention is not to be limited to the particular invention embodiments discussed herein, but should be defined only by the appended claims and equivalents thereof.

What is claimed is:

1. A computer controlled method for optimizing computation on a plurality of typed data-values stored in a variable, each of said plurality of typed data-values independently having a type wherein said type is a pointer type or an externally-tagged primitive type, said method comprising steps of:

(a) maintaining, external to said variable, a type identifier indicating said type of said variable's contents;

(b) determining a type usage pattern; and (c) optimizing access to said variable dependent on said type usage pattern;

wherein said variable is located in an object, a called routine accesses said variable and step (b) determines said type usage pattern by monitoring said type of said variable's contents as said plurality of typed data-values are stored in said variable.

2. The computer controlled method of claim 1 wherein step (c) comprises steps of:

(c1) constructing a plurality of class/map structures associated with said variable, at least one of said plurality of class/map structures being dependent on said type usage pattern and containing a pointer to said called routine; and (c2) invoking said called routine, using said pointer, to access said variable's contents.

3. The computer controlled method of claim 2 wherein said object contains a map/class pointer that points to a first of said plurality of class/map structures, and step (c) further comprises:

(c3) detecting a type change in said variable; and (c4) determining a second of said plurality of class/map structures based on said type change; and (c5) updating said map/class pointer in said object to point to said second of said plurality of class/map structures.

4. The computer controlled method of claim 2 wherein step (c2) further comprises selecting said pointer from said plurality of class/map structures dependent on said type identifier.

5. A computer controlled method for optimizing computation on a plurality of typed data-values stored in a variable, each of said plurality of typed data-values independently having a type wherein said type is a pointer type or an externally-tagged primitive type, said method comprising steps of:

(a) maintaining, external to said variable, a type identifier indicating said type of said variable's contents;

(b) determining a type usage pattern; and (c) optimizing access to said variable dependent on said type usage pattern;

wherein step (b) determines said type usage pattern dependent on a compiler generated type information and an execution state, and said variable is located in an activation record.

6. The computer controlled method of claim 5 wherein step (c) comprises steps of:

(c1) determining a preferred type for said variable's content; and (c2) optimizing, for said preferred type, an access procedure that accesses said variable.

7. The computer controlled method of claim 6 wherein said access procedure is a called routine and step (c2) comprises optimizing said called routine.

8. The computer controlled method of claim 6 wherein said access procedure is a call site that invokes a called routine and step (c2) comprises optimizing said call site.

9. The computer controlled method of claim 6 wherein step (c) further comprises:

(c3) creating a generalized access procedure that accesses said variable's content when said variable's content is not of said preferred type.

10. An apparatus having a central processing unit (CPU) and a memory coupled to said CPU for optimizing computation on a plurality of typed data-values stored in a variable, each of said plurality of typed data-values independently having a type wherein said type is a pointer type or an externally-tagged primitive type, said apparatus comprising:

a type maintenance mechanism configured to maintain, external to said variable, a type identifier indicating said type of said variable's contents;

a type usage determination mechanism configured to determine a type usage pattern dependent on the type maintenance mechanism; and a first optimization mechanism configured to optimize access to said variable dependent on said type usage pattern;

wherein said variable is located in an object, a called routine accesses said variable and the type usage determination mechanism determines said type usage pattern by monitoring said type of said variable's contents as said plurality of typed data-values are stored in said variable.

11. The apparatus of claim 10 wherein the first optimization mechanism comprises:

a class/map construction mechanism configured to construct a plurality of class/map structures associated with said variable, at least one of said plurality of class/map structures being dependent on said type usage pattern and containing a pointer to said called routine; and a routine invocation mechanism configured to invoke said called routine, using said pointer, to access said variable's contents.

12. The apparatus of claim 11 wherein said object contains a map/class pointer that points to a first of said plurality of class/map structures, and the first optimization mechanism further comprises:

a type change detection mechanism configured to detect a type change in said variable; and a class selection mechanism configured to determine a second of said plurality of class/map structures based on said type change; and an object updating mechanism configured to update said map/class pointer in said object to point to said second of said plurality of class/map structures.

13. The apparatus of claim 11 wherein the routine invocation mechanism further comprises a called routine selection mechanism configured to select said pointer from said plurality of class/map structures dependent on said type identifier.

14. An apparatus having a central processing unit (CPU) and a memory coupled to said CPU for optimizing computation on a plurality of typed data-values stored in a variable, each of said plurality of typed data-values independently having a type wherein said type is a pointer type or an externally-tagged primitive type, said apparatus comprising:

a type maintenance mechanism configured to maintain, external to said variable, a type identifier indicating said type of said variable's contents;

a type usage determination mechanism configured to determine a type usage pattern dependent on the type maintenance mechanism; and a first optimization mechanism configured to optimize access to said variable dependent on said type usage pattern;

wherein the type usage determination mechanism determines said type usage pattern dependent on a compiler generated type information and an execution state, and said variable is located in an activation record.

15. The apparatus of claim 14 wherein the first optimization mechanism comprises:

a preferred type determination mechanism configured to determine a preferred type for said variable's content; and an access procedure optimization mechanism configured to optimize, for said preferred type, an access procedure that accesses said variable.

16. The apparatus of claim 15 wherein said access procedure is a called routine and the access procedure optimization mechanism is configured to optimize said called routine.

17. The apparatus of claim 15 wherein said access procedure is a call site that invokes a called routine and the access procedure optimization mechanism is configured to optimize said call site.

18. The apparatus of claim 15 wherein the first optimization mechanism further comprises a generalized access procedure creation mechanism configured to create a generalized access procedure that accesses said variable's content when said variable's content is not of said preferred type.

19. A computer program product comprising:

a computer usable storage medium having computer readable code embodied therein for causing a computer to optimize computation on a plurality of typed data-values stored in a variable, each of said plurality of typed data-values independently having a type wherein said type is a pointer type or an externally-tagged primitive type; said computer readable code comprising:

computer readable program code configured to cause said computer to effect a type maintenance mechanism configured to maintain, external to said variable, a type identifier indicating said type of said variable's contents;

computer readable program code configured to cause said computer to effect a type usage determination mechanism configured to determine a type usage pattern dependent on the type maintenance mechanism; and computer readable program code configured to cause said computer to effect a first optimization mechanism configured to optimize access to said variable dependent on said type usage pattern;

wherein said variable is located in an object, a called routine accesses said variable and the type usage determination mechanism determines said type usage pattern by monitoring said type of said variable's contents as said plurality of typed data-values are stored in said variable.

20. The computer program product of claim 19 wherein the first optimization mechanism comprises:

computer readable program code configured to cause said computer to effect a class/map construction mechanism configured to construct a plurality of class/map structures associated with said variable, at least one of said plurality of class/map structures being dependent on said type usage pattern and containing a pointer to said called routine; and computer readable program code configured to cause said computer to effect a routine invocation mechanism configured to invoke said called routine, using said pointer, to access said variable's contents.

21. The computer program product of claim 20 wherein said object contains a map/class pointer that points to a first of said plurality of class/map structures, and the first optimization mechanism further comprises:

computer readable program code configured to cause said computer to effect a type change detection mechanism configured to detect a type change in said variable; and computer readable program code configured to cause said computer to effect a class selection mechanism configured to determine a second of said plurality of class/map structures based on said type change; and computer readable program code configured to cause said computer to effect an object updating mechanism configured to update said map/class pointer in said object to point to said second of said plurality of class/map structures.

22. The computer program product of claim 20 wherein the routine invocation mechanism further comprises computer readable program code configured to cause said computer to effect a called routine selection mechanism configured to select said pointer from said plurality of class/map structures dependent on said type identifier.

23. A computer program product comprising:

a computer usable storage medium having computer readable code embodied therein for causing a computer to optimize computation on a plurality of typed data-values stored in a variable, each of said plurality of typed data-values independently having a type wherein said type is a pointer type or an externally-tagged primitive type; said computer readable code comprising:

computer readable program code configured to cause said computer to effect a type maintenance mechanism configured to maintain, external to said variable, a type identifier indicating said type of said variable's contents;

computer readable program code configured to cause said computer to effect a type usage determination mechanism configured to determine a type usage pattern dependent on the type maintenance mechanism; and computer readable program code configured to cause said computer to effect a first optimization mechanism configured to optimize access to said variable dependent on said type usage pattern;

wherein the type usage determination mechanism determines said type usage pattern dependent on a compiler generated type information and an execution state, and said variable is located in an activation record.

24. The computer program product of claim 23 wherein the first optimization mechanism comprises:

computer readable program code configured to cause said computer to effect a preferred type determination mechanism configured to determine a preferred type for said variable's content; and computer readable program code configured to cause said computer to effect an access procedure optimization mechanism configured to optimize, for said preferred type, an access procedure that accesses said variable.

25. The computer program product of claim 24 wherein said access procedure is a called routine and the access procedure optimization mechanism is configured to optimize said called routine.

26. The computer program product of claim 24 wherein said access procedure is a call site that invokes a called routine and the access procedure optimization mechanism is configured to optimize said call site.

27. The computer program product of claim 24 wherein the first optimization mechanism further comprises computer readable program code configured to cause said computer to effect a generalized access procedure creation mechanism configured to create a generalized access procedure that accesses said variable's content when said variable's content is not of said preferred type.

* * * * *